(12) United States Patent
Ma et al.

(10) Patent No.: US 9,766,508 B2
(45) Date of Patent: Sep. 19, 2017

(54) METHOD FOR MANUFACTURING CURVED LIQUID CRYSTAL PANEL

(71) Applicant: Shenzhen China Star Optoelectronics Technology Co., Ltd., Shenzhen, Guangdong (CN)

(72) Inventors: Chao Ma, Guangdong (CN); Yungjui Lee, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 263 days.

(21) Appl. No.: 14/423,988

(22) PCT Filed: Nov. 5, 2014

(86) PCT No.: PCT/CN2014/090285
§ 371 (c)(1),
(2) Date: Feb. 25, 2015

(87) PCT Pub. No.: WO2016/061850
PCT Pub. Date: Apr. 28, 2016

(65) Prior Publication Data
US 2016/0116774 A1 Apr. 28, 2016

(30) Foreign Application Priority Data

Oct. 24, 2014 (CN) .......................... 2014 1 0579416

(51) Int. Cl.
*G02F 1/1341* (2006.01)
*G02F 1/1335* (2006.01)
(Continued)

(52) U.S. Cl.
CPC ........ *G02F 1/1341* (2013.01); *G02F 1/13394* (2013.01); *G02F 1/133512* (2013.01);
(Continued)

(58) Field of Classification Search
CPC ............. G02F 1/1341; G02F 1/133516; G02F 1/133514; G02F 1/133512
See application file for complete search history.

(56) References Cited

U.S. PATENT DOCUMENTS

| 2002/0191145 A1* | 12/2002 | Choo ................... G02F 1/1303 349/187 |
| 2008/0137013 A1* | 6/2008 | Kamoshida ....... G02F 1/133305 349/106 |

FOREIGN PATENT DOCUMENTS

| CN | 103955096 A | 7/2014 |
| CN | 104111567 A | 10/2014 |

* cited by examiner

*Primary Examiner* — Mark A Osele
*Assistant Examiner* — Christopher C Caillouet
(74) *Attorney, Agent, or Firm* — Andrew C. Cheng

(57) ABSTRACT

The present invention provides a method for manufacturing a curved liquid crystal panel, which includes Step 1: presetting radii of curvature of a CF substrate and an array substrate of a curved liquid crystal panel; Step 2: preparing the CF substrate (1) and the array substrate (2), the CF substrate (1) and the array substrate (2) being both in the form of a flat panel, where in step (2), a spacing distance L2 between two adjacent data lines (21) and a spacing distance L1 of black matrixes (11) in a direction in which the data lines (21) is lined up are set to be different; Step 3: individually curving the CF substrate (1) and the array substrate (2) to reach the pre-set radii of curvature of Step 1; and Step 4: subjecting the curved CF substrate (1) and array substrate (2) to vacuum lamination through curved surface lamination to be laminated together to form a curved liquid crystal panel. This method eliminates the displaying defects caused by the conventional way of manufacturing a curved liquid crystal panel and effectively enhances the product yield rate.

11 Claims, 6 Drawing Sheets

(51) Int. Cl.
*G02F 1/1339* (2006.01)
*G02F 1/1333* (2006.01)
(52) U.S. Cl.
CPC .. *G02F 1/133514* (2013.01); *G02F 1/133516* (2013.01); *G02F 2001/13396* (2013.01); *G02F 2001/133354* (2013.01)

METHOD FOR MANUFACTURING CURVED LIQUID CRYSTAL PANEL

BACKGROUND OF THE INVENTION

1. Field of the Invention

The present invention relates to the field of displaying technology, and in particular to a method for manufacturing a curved liquid crystal panel.

2. The Related Arts

A liquid crystal display (LCD) is composed of an enclosure, a liquid crystal panel arranged in the enclosure, and a backlight module mounted in the enclosure, in which the liquid crystal panel is composed of a color filter (CF) substrate, a thin-film transistor (TFT) array substrate, and a liquid crystal layer filled between the two substrates. The CF substrate and the array substrate have inside surfaces that face each other and comprise transparent electrodes formed thereon. The liquid crystal display applies an electric field to control the orientation of the liquid crystal molecules so as to change the polarization state of light and uses a polarizer to select transmission or blocking of a light path so as to achieve the purpose of displaying. With the progress of the displaying technology, people's demands of consumer electronics are no longer limited to functionality and also require satisfactory aspects in regard to design, aesthetics, and excellent visual experience. A curved liquid crystal display that has been created for such purposes is not only a novel design but also providing better visual effect and experience.

A curved liquid crystal panel is a key component of a curved liquid crystal display. A conventional way of manufacturing a curved liquid crystal panel is to first laminate prepared CF substrate and array substrate in a flat condition to form a flat panel like liquid crystal panel and to subject the flat panel like liquid crystal panel to the application of an external force so as to make the liquid crystal panel that is originally in the form of a flat panel curved, where a degree of curving (radius of curvature) is determined according to a design size and viewing distance of the liquid crystal panel.

In a liquid crystal panel of a main stream LCD, a black matrix (BM) is provided on the CF substrate side to prevent the occurrence of light leakage at the site of each of pixels. Further, photo spacers (PSs) are provided between the CF substrate and the array substrate to maintain the distance between the two substrates in order to prevent the occurrence of abnormality.

As shown in FIG. 1, in the conventional way of manufacturing a curved liquid crystal panel, when the liquid crystal panel is being curved, since the CF substrate 100 and the array substrate 200 are moved relative to each other, a relative displacement of the black matrix 110 with respect to TFT pixels occurs in a curving portion, resulting in change of aperture ratio and causing dark blocks occurring in eye vision during a displaying process. When the liquid crystal panel is further curved, the relative shift between the CF substrate and the array substrate 200 is further enlarged so that two adjacent color resist blocks may move to locations close to a data line 210. The electric field around the data line 210 would cause the liquid crystal molecules to rotate and eventually, light leakage results. Such a displaying defect is even more apparent in displaying a pure color image. Thus, the relative shift between the CF substrate 100 and the array substrate 200 would cause movement of color resist, leading to color shift of the mixed color and irregularity of displayed color.

As shown in FIG. 2, due to the curving of the liquid crystal panel, the photo spacers 400 that were originally distributed in a reasonable manner in a flat panel are caused to generate different pushing effects that are generally in proportion to the different degrees of curving from the center of the liquid crystal panel to the two opposite, left and right, edges. With the curving of the liquid crystal panel, the curvature at the locations marked B, C, D and B', C', D' in FIG. 2 changes so that photo spacers 400 at different locations would be of different heights. This readily leads to a potential risk that the cell thickness of the liquid crystal layer 300 becomes inconsistent due to the photo spacers 400 at different locations having different heights.

In brief, for a liquid crystal panel of which a circumference is adhesively fixed by enclosure resin 600, to change from a flat panel form into a curved condition would cause the array substrate 200 and the CF substrate 100 to move relative to each other and thus changes of the aperture ratio and the cell thickness of the liquid crystal layers 300 at different locations of the liquid crystal panel, in the entirety thereof and consequently displaying defects associated therewith would result.

SUMMARY OF THE INVENTION

An object of the present invention is to provide a method for manufacturing a curved liquid crystal panel, which eliminates displaying defects caused by the conventional way of manufacturing a liquid crystal panel so as to effectively enhance product yield rate, make the manufacturing process simple, and require no additional cost.

To achieve the above object, the present invention provides a method for manufacturing a curved liquid crystal panel, which comprises the following steps:

(1) pre-setting radii of curvature of a color filter (CF) substrate and an array substrate of a curved liquid crystal panel;

(2) preparing the CF substrate and the array substrate, the CF substrate and the array substrate being both in the form of a flat panel, wherein the array substrate comprises a plurality of equally spaced data lines lined up thereon and the CF substrate comprises black matrixes arranged thereon in an array, a spacing distance L2 between two adjacent ones of the data lines and a spacing distance L1 of the black matrixes in a direction in which the data lines are lined up being arranged to be different according to the pre-set radii of curvature provided in step (1);

(3) individually curving the CF substrate and the array substrate to reach the pre-set radii of curvature of step (1); and (4) subjecting the curved CF substrate and array substrate to vacuum lamination through curved surface lamination to be laminated together to form a curved liquid crystal panel.

The method for manufacturing a curved liquid crystal panel further comprises step (5), in which the vacuum-laminated CF substrate and array substrate are subjected to cutting.

Wherein the CF substrate and the array substrate comprise display zones formed thereon to correspond to each other and step (2) comprises coating a loop of enclosure resin on the CF substrate or the array substrate to enclose the display zone and dripping liquid crystal inboard the enclosure resin to form a liquid crystal layer.

Wherein the black matrix is formed through exposure with a photo mask.

Wherein in step (2), with the CF substrate and the array substrate being in the form of a flat panel, the spacing distance L2 between two adjacent ones of the data lines and the spacing distance L1 of the black matrix in the direction in which the data lines are lined up are set in a proportional relationship and with the pre-set radius of curvature of the CF substrate being R and a cell thickness of the liquid crystal layer between the CF substrate and the array substrate being d, L1:L2=R:(R+d) or L1:L2=R:(R−d).

Wherein in step (4), when the CF substrate and the array substrate are subjected to vacuum lamination through curved surface lamination to be laminated together, the black matrixes are distributed in a curving direction of the curved liquid crystal panel in such a way as to be respectively coincident with the data lines in a radial direction of the curved liquid crystal panel so that pixel areas of the array substrate and the CF substrate match each other.

Wherein in step (2), the CF substrate further comprises a plurality of photo spacers formed thereon and based on the radius of curvature that is pre-set for the CF substrate in step (1), heights of the photo spacers at different locations of the CF substrate are set to be different.

Wherein in step (2), with the CF substrate and the array substrate in the form of a flat panel, the photo spacers located in a middle portion of the CF substrate have heights greater than those of the photo spacers in two side portions, and in step (4), when the CF substrate and the array substrate are subjected to vacuum lamination through curved surface lamination, the photo spacers at different locations of the CF substrate are of the same height so that the cell thickness of the liquid crystal layer of the curved liquid crystal panel is identical for different locations.

Wherein step (2) uses flat panel coating to form the CF substrate and the array substrate.

Wherein step (5) uses erected panel cutting to carry out cutting.

The efficacy of the present invention is that the present invention provides a method for manufacturing a curved liquid crystal panel, in which a CF substrate and an array substrate are individually curved first and laminated to each other and cut in a curved condition, with a reasonable design of black matrixes and photo spacers being involved. This method is different from a conventional way of manufacturing a curved liquid crystal panel that requires a liquid crystal panel to be curved in the entirety thereof so as to overcome problems resulting from displacements of the black matrixes and height difference of the photo spacers caused by relative displacement between the CF substrate and the array substrate during a curving process of a flat liquid crystal panel and thus eliminating displaying defects occurring in the conventional way of manufacturing a curved liquid crystal panel thereby effectively enhancing product yield rate, making the manufacturing process simple, and requiring no additional cost.

BRIEF DESCRIPTION OF THE DRAWINGS

The technical solution, as well as other beneficial advantages, of the present invention will be apparent from the following detailed description of embodiments of the present invention, with reference to the attached drawing.

In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
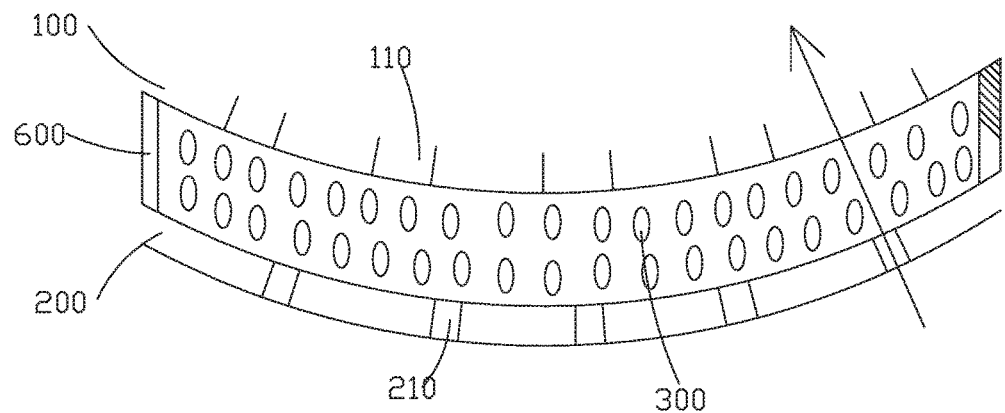
FIG. 1 is a schematic view illustrating a defect of light leakage caused by a conventional way of manufacturing a curved liquid crystal panel.
Figure 2:
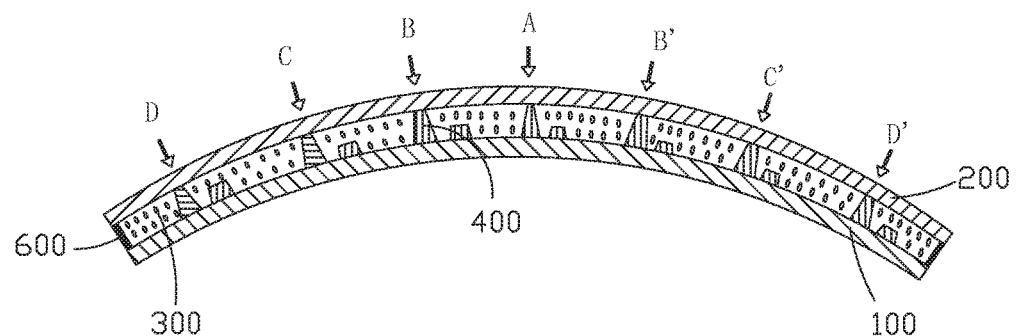
FIG. 2 is a schematic view illustrating a defect of inconsistent liquid crystal cell thickness caused by a conventional way of manufacturing a curved liquid crystal panel.
Figure 3:
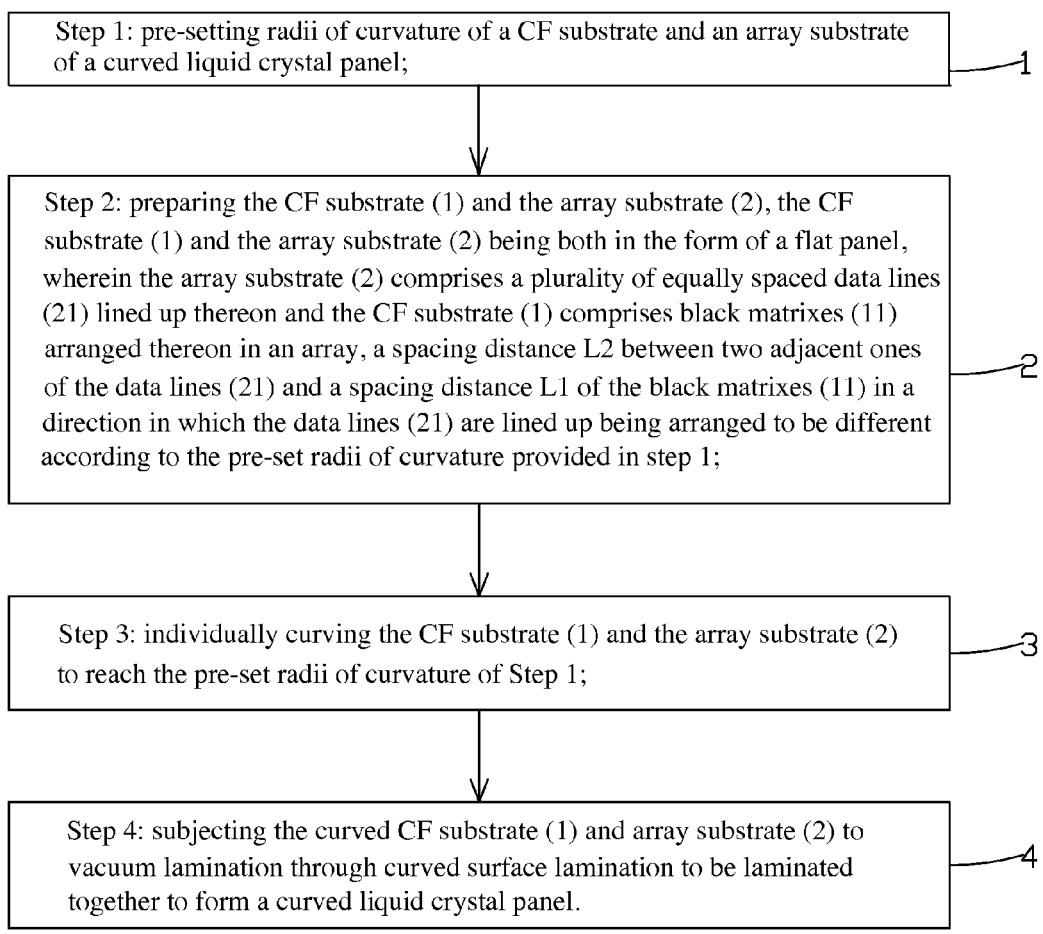
FIG. 3 is a flow chart illustrating a method for manufacturing a curved liquid crystal panel according to the present invention.

Referring to FIG. 3, the present invention provides a method for manufacturing a curved liquid crystal panel, which comprises the following steps:

Step 1: pre-setting radii of curvature of a color filter (CF) substrate and an array substrate of a curved liquid crystal panel according to design requirements.

It is noted here that the pre-set radius of curvature of the CF substrate and the pre-set radius of curvature of the array substrate is different from each other by the cell thickness of a liquid crystal layer and thus, the pre-set radius of curvature of the CF substrate that faces a viewer is set as a radius of curvature of the curved liquid crystal panel.

Step 2: preparing the CF substrate 1 and the array substrate 2.

Figure 4:
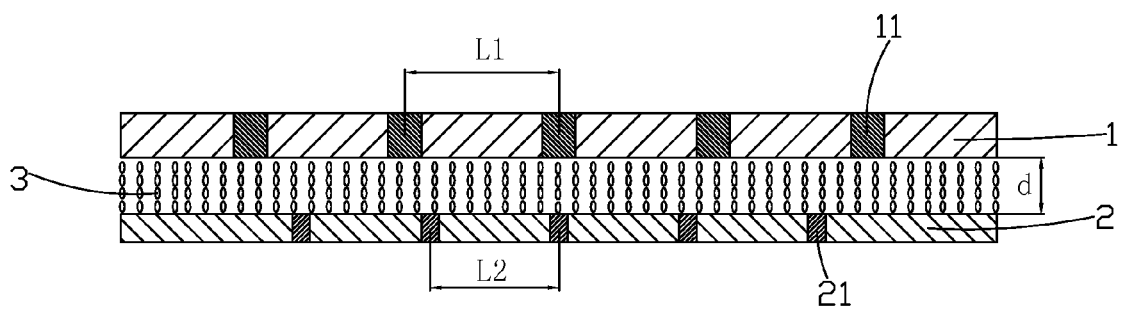
FIG. 4 is a schematic view illustrating a second step of the method for manufacturing a curved liquid crystal panel according to the present invention.
Figure 5:
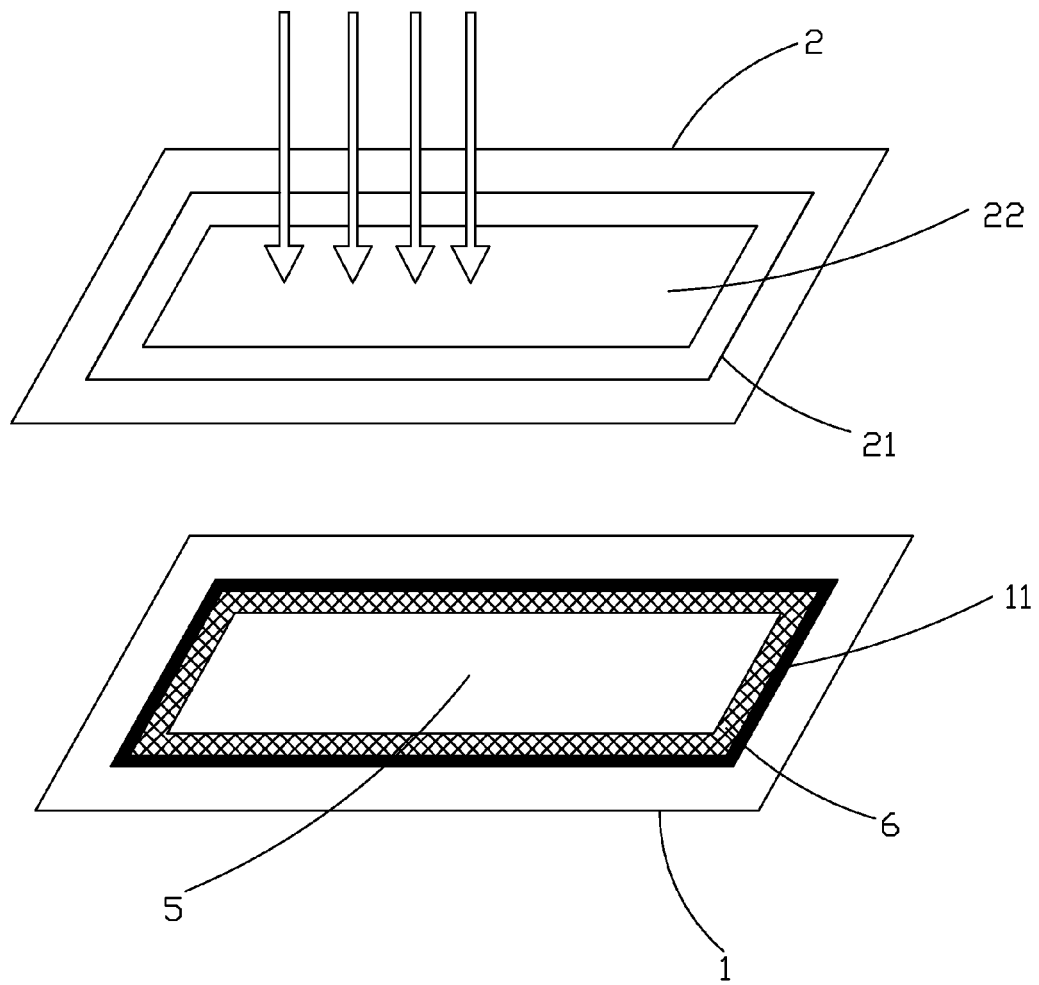
FIG. 5 is a schematic view illustrating formation of a black matrix and application of enclosure resin in the second step of the method for manufacturing a curved liquid crystal panel according to the present invention.

Referring collectively to FIGS. 4 and 5, Step 2 is identical to a process of preparing a CF substrate and an array substrate included in a conventional way of manufacturing a curved liquid crystal panel. In other words, the CF substrate 1 and the array substrate 2 are formed through a process of flat panel coating. After completion of Step 2, the CF substrate 1 and the array substrate 2 are both in the form of a flat panel. And, the CF substrate 1 and the array substrate 2 are both provided with display zones 5 that correspond to each other.

Step 2 comprises coating a loop of enclosure resin 6 on the CF substrate 1 or the array substrate 2 to enclose the display zone 5 and dripping liquid crystal inboard the enclosure resin 6 to form a liquid crystal layer 3. The coating of the enclosure resin 6 is also identical to a process of coating enclosure resin included in a conventional way of manufacturing a curved liquid crystal panel. In other words, the coating of the enclosure resin 6 is carried out through a flat panel coating process.

It is noted here that in Step 2, black matrixes 11 and photo spacers 4 arranged on the CF substrate 1 are different from those of a conventional CF substrate.

Specifically, Step 2 uses a reasonably designed photo mask 22 to subject black material photoresist to exposure for forming the black matrixes 11 on the CF substrate 1 and the black matrixes 11 are arranged as an array. For a liquid crystal panel having a specific curvature, it only needs one photo mask 22 for exposure so that no additional cost is required. The array substrate 2 comprises a plurality of data lines 21 formed thereon and the plurality of data lines 21 are arranged to line up in an equally spaced manner. Under this condition, with both the CF substrate 1 and the array substrate 2 staying in the form of a flat panel, based on the pre-set radii of curvature provided in Step 1, a spacing distance L2 between two adjacent ones of the data lines 21 and a spacing distance L1 of the black matrixes 11 in the direction in which the data lines 21 are lined up are designed to be different, this being different from a conventional substrate in which a spacing distance L1 of the black matrixes 11 in a direction in which the data lines 21 are lined up and a spacing distance L2 between two adjacent ones of the data lines 21 are set equal to each other.

Further, in the instant embodiment, L2 and L1 are set in a proportional relationship. With the pre-set radius of curvature of the CF substrate 1 being designated as R and a cell thickness of a liquid crystal layer 3 between the CF substrate 1 and the array substrate 2 being designated as d, where R is the distance from a center of a curved form of the CF substrate 1 to a surface thereof adjacent to the liquid crystal layer 3, when the curved liquid crystal panel is designed to curve in a direction toward the CF substrate 1, the pre-set radius of curvature of the array substrate 2 is correspondingly R+d, which is the distance from a center of a curved form of the array substrate 2 to a surface thereof adjacent to the liquid crystal layer 3 and L1:L2=R:(R+d) is selected; and when the curved liquid crystal panel is designed to curved in a direction toward the array substrate 2, the pre-set radius of curvature of the array substrate 2 is correspondingly R−d and L1:L2=R:(R−d) is selected.

Also, a plurality of photo spacers 4 are formed on the CF substrate 1 and based on the radius of curvature that is pre-set for the CF substrate in Step 1, heights of the photo spacers 4 at different locations of the CF substrate 1 are set to be different, this being different from the conventional way of manufacturing a curved liquid crystal panel, where the heights of the photo spacers at different locations of a CF substrate are set to be identical. Under this condition, with the CF substrate 1 and the array substrate 2 being in the form of a flat panel, the photo spacers 4 at a middle portion of the CF substrate 1 are of heights that are greater than the heights of the photo spacers 4 at two edge portions thereof. Arranging the photo spacers 4 in this way is that after the completion of the subsequent Step 3 and Step 4, in which the CF substrate 1 and the array substrate 2 are curved and subjected to vacuum lamination through curved surface lamination so as to form a curved liquid crystal panel, the middle portions of the CF substrate 1 and the array substrate 2 generally bear stresses and compression that are greater than stresses and compression at the two side portions so that by setting the photo spacers 4 in the middle portion of the CF substrate 1 to be higher than the photo spacers 4 in the two side portions, the photo spacers 4 in the middle portion of the CF substrate 1 can bear a great stress than those of the photo spacers 4 in the two side portions so as to then make the photo spacers 4 at different locations of the CF substrate 1 identical in height thereby the spacing between the CF substrate 1 and the array substrate 2 being made consistent and the cell thicknesses of liquid crystal layers 3 of the entirety of the curved liquid crystal panel being identical.

Step 3: individually curving the CF substrate 1 and the array substrate 2 to reach the pre-set radii of curvature of Step 1.

Step 3 is obviously different from the conventional way of manufacturing a curved liquid crystal panel that requires a CF substrate and an array substrate to first assembled together to form a flat liquid crystal panel and then the entirety of the flat liquid crystal panel being subjected to a curving process in that the CF substrate 1 and the array substrate 2 are first curved, individually, to the pre-set radii of curvature.

Step 4: subjecting the curved CF substrate 1 and array substrate 2 to vacuum lamination through curved surface lamination to be laminated together to form a curved liquid crystal panel.

Figure 6:
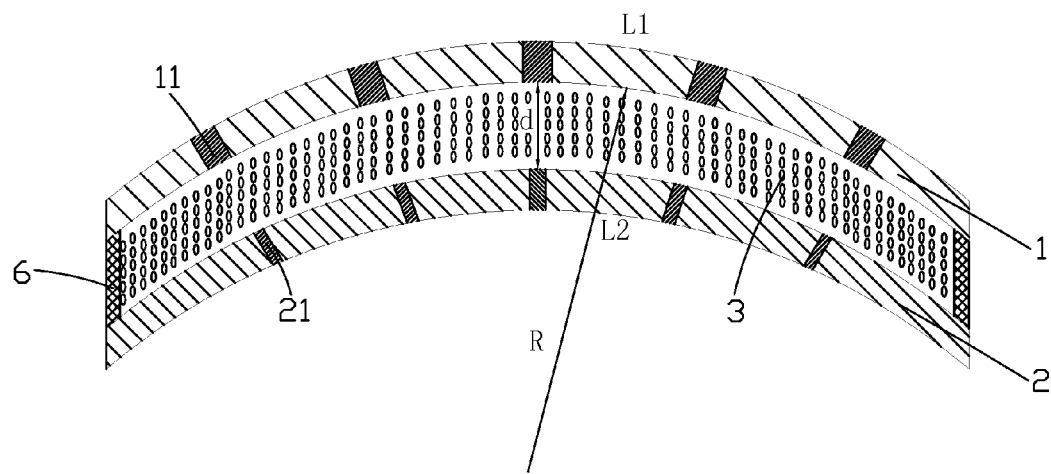
FIG. 6 is a schematic view illustrating a fourth step of the method for manufacturing a curved liquid crystal panel according to the present invention, showing the black matrix and data lines.
Figure 7:
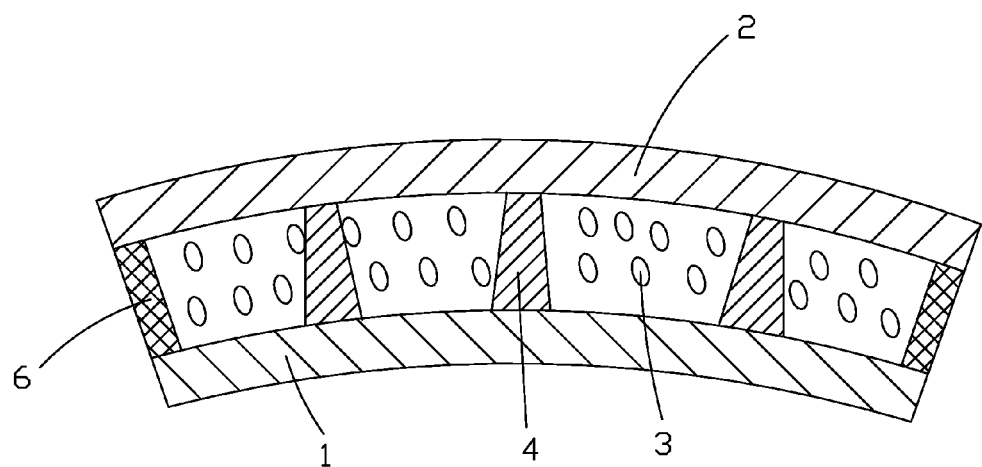
FIG. 7 is a schematic view illustrating the fourth step of the method for manufacturing a curved liquid crystal panel according to the present invention, showing photo spacers.

After Step 3, in which the CF substrate 1 and the array substrate 2 are individually curved, Step 4 adopts a curved surface lamination process to carry out lamination in order to achieve assembling the curved CF substrate 1 and array substrate 2 together. As shown in FIGS. 6 and 7, due to the reasonable design of the black matrix 11 and the photo spacers 4 achieved in Step 2, when the CF substrate 1 and the array substrate 2 are in a curved condition, the black matrixes 11 are distributed in a curving direction of the curved liquid crystal panel in such a way as to be respectively coincident with the data lines 21 in a radial direction of the curved liquid crystal panel so that pixel areas of the array substrate 2 and the CF substrate 1 match each other to thereby prevent defects of light leakage. The photo spacers 4 that are located at different locations of the CF substrate 1 provide identical pushing effect to the array substrate 2 so that the heights of the photo spacers 4 at different locations become the same, making the cell thicknesses of the liquid crystal layers 3 at different locations identical thereby preventing defects resulting from inconsistency of the cell thicknesses of the liquid crystal layers 3.

If division of a large-sized curved liquid crystal panel into small-sized ones is desired, the method for manufacturing a curved liquid crystal panel according to the present invention may further comprise Step 5, in which the vacuum-laminated CF substrate 1 and array substrate 2 are subjected to cutting.

Figure 8:
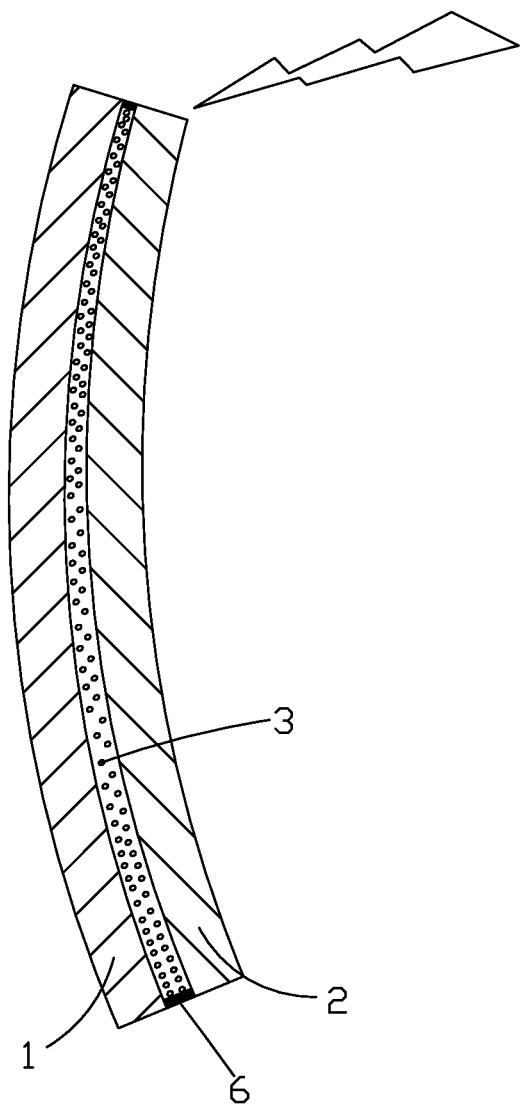
FIG. 8 is a schematic view illustrating erected panel cutting included in the method for manufacturing a curved liquid crystal panel according to the present invention.

Specifically, as shown in FIG. 8, Step 5 adopts erected panel cutting to carry out the cutting operation. The erected panel cutting is to subject the curved liquid crystal panel to cutting in an erected condition in order to reduce the influence caused by cutting on the radius of curvature of the curved liquid crystal panel.

In summary, the present invention provides a method for manufacturing a curved liquid crystal panel, in which a CF substrate and an array substrate are individually curved first and laminated to each other and cut in a curved condition, with a reasonable design of black matrixes and photo spacers being involved. This method is different from a conventional way of manufacturing a curved liquid crystal panel that requires a liquid crystal panel to be curved in the entirety thereof so as to overcome problems resulting from displacements of the black matrixes and height difference of the photo spacers caused by relative displacement between the CF substrate and the array substrate during a curving process of a flat liquid crystal panel and thus eliminating displaying defects occurring in the conventional way of manufacturing a curved liquid crystal panel thereby effectively enhancing product yield rate, making the manufacturing process simple, and requiring no additional cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a curved liquid crystal panel, comprising the following steps:
   (1) pre-setting radii of curvature of a color filter (CF) substrate and an array substrate of a curved liquid crystal panel;
   (2) preparing the CF substrate and the array substrate, the CF substrate and the array substrate being both in the form of a flat panel, wherein the array substrate comprises a plurality of equally spaced data lines lined up thereon and the CF substrate comprises black matrixes arranged thereon in an array, a spacing distance L2 between two adjacent ones of the data lines and a spacing distance L1 of the black matrixes in a direction in which the data lines are lined up being arranged to be different according to the pre-set radii of curvature provided in step (1);
   (3) separately curving the CF substrate and the array substrate to reach the pre-set radii of curvature of step (1); and
   (4) subjecting the curved CF substrate and the curved array substrate, which are separate from each other, to vacuum lamination through curved surface lamination to be laminated together to form a curved liquid crystal panel.

2. The method for manufacturing a curved liquid crystal panel as claimed in claim 1 further comprising step (5), in which the vacuum-laminated CF substrate and array substrate are subjected to cutting.

3. The method for manufacturing a curved liquid crystal panel as claimed in claim 2, wherein step (5) uses erected panel cutting to carry out cutting.

4. The method for manufacturing a curved liquid crystal panel as claimed in claim 1, wherein the CF substrate and the array substrate comprise display zones formed thereon to correspond to each other and step (2) comprises coating a loop of enclosure resin on the CF substrate or the array substrate to enclose the display zone and dripping liquid crystal inboard the enclosure resin to form a liquid crystal layer.

5. The method for manufacturing a curved liquid crystal panel as claimed in claim 1, wherein the black matrix is formed through exposure with a photo m.

6. The method for manufacturing a curved liquid crystal panel as claimed in claim 1, wherein in step (2), with the CF substrate and the array substrate being in the form of a flat panel, the spacing distance L2 between two adjacent ones of the data lines and the spacing distance L1 of the black matrix in the direction in which the data lines are lined up are set in a proportional relationship and with the pre-set radius of curvature of the CF substrate being R and a cell thickness of the liquid crystal layer between the CF substrate and the array substrate being d, L1:L2=R:(R+d) or L1:L2=R:(R−d).

7. The method for manufacturing a curved liquid crystal panel as claimed in claim 6, wherein in step (4), when the CF substrate and the array substrate are subjected to vacuum lamination through curved surface lamination to be laminated together, the black matrixes are distributed in a curving direction of the curved liquid crystal panel in such a way as to be respectively coincident with the data lines in a radial direction of the curved liquid crystal panel so that pixel areas of the array substrate and the CF substrate match each other.

8. The method for manufacturing a curved liquid crystal panel as claimed in claim 1, wherein in step (2), the CF substrate further comprises a plurality of photo spacers formed thereon and based on the radius of curvature that is pre-set for the CF substrate in step (1), heights of the photo spacers at different locations of the CF substrate are set to be different.

9. The method for manufacturing a curved liquid crystal panel as claimed in claim 8, wherein in step (2), with the CF substrate and the array substrate in the form of a flat panel, the photo spacers located in a middle portion of the CF substrate have heights greater than those of the photo spacers in two side portions, and in step (4), when the CF substrate and the array substrate are subjected to vacuum lamination through curved surface lamination, the photo spacers at different locations of the CF substrate are of the same height so that the cell thickness of the liquid crystal layer of the curved liquid crystal panel is identical for different locations.

10. The method for manufacturing a curved liquid crystal panel as claimed in claim 1, wherein step (2) uses flat panel coating to form the CF substrate and the array substrate.

11. A method for manufacturing a curved liquid crystal panel, comprising the following steps:
   (1) pre-setting radii of curvature of a color filter (CF) substrate and an array substrate of a curved liquid crystal panel;
   (2) preparing the CF substrate and the array substrate, the CF substrate and the array substrate being both in the form of a flat panel, wherein the array substrate comprises a plurality of equally spaced data lines lined up thereon and the CF substrate comprises black matrixes arranged thereon in an array, a spacing distance L2 between two adjacent ones of the data lines and a spacing distance L1 of the black matrixes in a direction in which the data lines are lined up being arranged to be different according to the pre-set radii of curvature provided in step (1);
   (3) separately curving the CF substrate and the array substrate to reach the pre-set radii of curvature of step (1); and
   (4) subjecting the curved CF substrate and the curved array substrate, which are separate from each other, to vacuum lamination through curved surface lamination to be laminated together to form a curved liquid crystal panel;
   further comprising step (5), in which the vacuum-laminated CF substrate and array substrate are subjected to cutting;
   wherein the CF substrate and the array substrate comprise display zones formed thereon to correspond to each other and step (2) comprises coating a loop of enclosure resin on the CF substrate or the array substrate to enclose the display zone and dripping liquid crystal inboard the enclosure resin to form a liquid crystal layer;
   wherein the black matrix is formed through exposure with a photo mask;
   wherein in step (2), with the CF substrate and the array substrate being in the form of a flat panel, the spacing distance L2 between two adjacent ones of the data lines and the spacing distance L1 of the black matrix in the direction in which the data lines are lined up are set in a proportional relationship and with the pre-set radius of curvature of the CF substrate being R and a cell thickness of the liquid crystal layer between the CF substrate and the array substrate being d, L1:L2=R:(R+d) or L1:L2=R:(R−d);

wherein in step (4), when the CF substrate and the array substrate are subjected to vacuum lamination through curved surface lamination to be laminated together, the black matrixes are distributed in a curving direction of the curved liquid crystal panel in such a way as to be respectively coincident with the data lines in a radial direction of the curved liquid crystal panel so that pixel areas of the array substrate and the CF substrate match each other;

wherein in step (2), the CF substrate further comprises a plurality of photo spacers formed thereon and based on the radius of curvature that is pre-set for the CF substrate in step (1), heights of the photo spacers at different locations of the CF substrate are set to be different;

wherein in step (2), with the CF substrate and the array substrate in the form of a flat panel, the photo spacers located in a middle portion of the CF substrate have heights greater than those of the photo spacers in two side portions, and in step (4), when the CF substrate and the array substrate are subjected to vacuum lamination through curved surface lamination, the photo spacers at different locations of the CF substrate are of the same height so that the cell thickness of the liquid crystal layer of the curved liquid crystal panel is identical for different locations;

wherein step (2) uses flat panel coating to form the CF substrate and the array substrate; and wherein step (5) uses erected panel cutting to carry out cutting.

* * * * *